(12) United States Patent
Dinkelman et al.

(10) Patent No.: US 12,009,471 B2
(45) Date of Patent: Jun. 11, 2024

(54) METHOD FOR BONDING THERMOPLASTIC COMPONENTS IN A BATTERY MODULE

(71) Applicant: CPS Technology Holdings LLC, New York, NY (US)

(72) Inventors: John P. Dinkelman, South Milwaukee, WI (US); Jason D. Fuhr, Sussex, WI (US); Richard M. DeKeuster, Racine, WI (US)

(73) Assignee: CPS Technology Holdings LLC, New York, NY (US)

( * ) Notice: Subject to any disclaimer, the term of this patent is extended or adjusted under 35 U.S.C. 154(b) by 978 days.

(21) Appl. No.: 16/753,916

(22) PCT Filed: Oct. 5, 2018

(86) PCT No.: PCT/US2018/054684
§ 371 (c)(1),
(2) Date: Apr. 6, 2020

(87) PCT Pub. No.: WO2019/071176
PCT Pub. Date: Apr. 11, 2019

(65) Prior Publication Data
US 2020/0365848 A1    Nov. 19, 2020

Related U.S. Application Data

(60) Provisional application No. 62/568,951, filed on Oct. 6, 2017.

(51) Int. Cl.
*H01M 10/0525* (2010.01)
*H01M 50/227* (2021.01)
(Continued)

(52) U.S. Cl.
CPC ..... *H01M 10/0525* (2013.01); *H01M 50/227* (2021.01); *H01M 50/231* (2021.01); *H01M 50/278* (2021.01); *H01M 2220/20* (2013.01)

(58) Field of Classification Search
CPC ................................................ H01M 10/0525
See application file for complete search history.

(56) References Cited

U.S. PATENT DOCUMENTS

2016/0064703 A1* 3/2016 Mack ................. B29C 66/322
156/272.8

FOREIGN PATENT DOCUMENTS

| CN | 105051933 A | 11/2015 |
| DE | 102008027000 A1 | 12/2009 |
| WO | 2016/033210 A1 | 3/2016 |

OTHER PUBLICATIONS

International Search Report and Written Opinion of the International Searching Authority dated Dec. 6, 2018, for Appln. No. PCT/US2018/054684 filed Oct. 5, 2018, 13 pgs.

* cited by examiner

*Primary Examiner* — Daniel S Gatewood
(74) *Attorney, Agent, or Firm* — Boardman & Clark LLP (57) ABSTRACT

A method for bonding components of a lithium ion battery module includes positioning an energy absorbing insert adjacent to a first thermoplastic layer of the lithium ion battery module and to a second thermoplastic layer of the lithium ion battery module. Energy is applied to the energy absorbing insert to melt the energy absorbing insert and thereby fuse the first thermoplastic layer to the second thermoplastic layer. The first thermoplastic layer is a transmissive or semi-transmissive layer configured to allow the energy the pass through the first thermoplastic layer for absorption by the energy absorbing insert.

20 Claims, 5 Drawing Sheets

(51) Int. Cl.
*H01M 50/231* (2021.01)
*H01M 50/278* (2021.01)

METHOD FOR BONDING THERMOPLASTIC COMPONENTS IN A BATTERY MODULE

CROSS REFERENCE TO RELATED APPLICATIONS

This application is a national phase filing of International Patent Application No. PCT/US2018/054684 entitled METHOD FOR BONDING THERMOPLASTIC COMPONENTS IN A BATTERY MODULE, which has an international filing date of Oct. 5, 2018, which claims priority from and the benefit of U.S. Provisional Application Ser. No. 62/568,951, entitled "METHOD FOR BONDING THERMOPLASTIC COMPONENTS TOGETHER," filed 6 Oct. 2017, each of which is hereby incorporated by reference in its entirety herein for all purposes.

BACKGROUND

The present disclosure relates generally to the field of batteries and battery modules. More specifically, the present disclosure relates to a method and system for fusing thermoplastic layers of a lithium ion battery module.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, lithium ion battery modules are generally considered sensitive to environmental conditions. Accordingly, there is a need for lithium ion battery modules that are able to isolate internal components of such modules from the external environment.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a method for bonding components of a lithium ion battery module that includes positioning an energy absorbing insert adjacent to a first thermoplastic layer of the lithium ion battery module and to a second thermoplastic layer of the lithium ion battery module. Energy is applied to the energy absorbing insert to melt the energy absorbing insert and thereby fuse the first thermoplastic layer to the second thermoplastic layer. The first thermoplastic layer is a transmissive or semi-transmissive layer configured to allow the energy the pass through the first thermoplastic layer for absorption by the energy absorbing insert.

The present disclosure also relates to a lithium ion battery module housing including a thermoplastic cover, a thermoplastic battery housing lid secured to the thermoplastic cover, and an energy absorbing insert positioned between the thermoplastic cover and the thermoplastic battery housing lid and forming at least a part of a plastic weld joint between the thermoplastic cover and the thermoplastic battery housing lid.

The present disclosure further relates to a lithium ion battery module having a plurality of lithium ion battery cells held within an enclosure. The lithium ion battery module also includes a battery module housing coupled to a lid, the battery module housing and the lid forming the enclosure. A plurality of electronics components are held within an electronics compartment formed by the lid and a cover of the lithium ion battery module. The plurality of electronics components are operatively coupled to the plurality of lithium ion battery cells. The battery module housing and the lid are joined by a first weld and the lid and the cover are joined by a second weld. The second weld is formed between the lid and the cover via an energy absorbing insert having an increased absorbance in the infrared portion of the electromagnetic spectrum relative to the battery module housing and the cover.

DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As set forth above, there is a need for enclosures for lithium ion battery modules to have a seal that isolates the internal components of the battery module from the environment. In this respect, the use of plastics may be desirable for use in lithium ion battery modules. For instance, plastics are usually considered lightweight, water resistant, and may be constructed to have strengths that approach or even exceed certain metal constructions.

Thermoplastics are a type of plastic material that becomes pliable when subjected to a temperature above a predefined threshold (based on the particular thermoplastic material) to allow plastic deformation and melting. This temperature may be referred to as the glass transition temperature ($T_g$).

When a thermoplastic is below its $T_g$, it is solid. Thermoplastics are generally considered to be resistant to shrinkage, durable, and strong.

In general, there are various techniques for bonding thermoplastics. Solvent bonding is a technique that uses solvent to dissolve adjacent surfaces of two thermoplastic components to be bonded such as to allow the material to flow together. Once the solvent evaporates, only the material-to-material bond is left. Another method for bonding thermoplastic involves one or more types of adhesives for bonding two thermoplastic components. Similar to solvent bonding, adhesives require a fluid type material to be added between the two thermoplastic components. This adds to the complexity and cost of manufacturing as the fluid adhesive must be carefully applied such as not to contaminate other portions of the thermoplastic components or elements of the apparatus. Further, certain thermoplastic materials such as polypropylene are notoriously difficult for adhesives to stick to, thereby limiting the usefulness of this adhesive based method for fusing thermoplastics together.

Another method for bonding two thermoplastic components together relies on using ultrasonic energy to heat and melt thermoplastics together. However, this process disadvantageously uses relatively large amounts of power and lacks precision application of the ultrasonic energy to a specific area of the thermoplastic.

It is now recognized that these shortcomings of traditional approaches may be overcome by the approaches described herein. For example, present embodiments include providing an energy absorbing insert that is positioned adjacent two transparent/semi-transparent thermoplastic components. Energy, such as laser energy, may be passed through a transparent thermoplastic component to the energy absorbing insert, which absorbs the energy. In response to such absorbance, the energy absorbing insert heats, and may melt and fuse the two adjacent thermoplastic components thereby creating a weld joint. In one or more embodiments, the energy absorbing insert is a thermoplastic. In one or more embodiments, more than two thermoplastic components are stacked onto each other with a respective energy absorbing insert sandwiched in between or adjacent to a pair of thermoplastic components.

As discussed herein, these processes may be particularly useful for lithium ion battery module construction due to the relatively high level of precision that is desired for optimal performance and lifetime. Indeed, the battery systems described herein may be used to provide power to various types of electric vehicles (xEVs) and other high voltage energy storage/expending applications (e.g., electrical grid power storage systems) subject to a wide variety of conditions and environmental stresses. Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of an xEV. As another example, battery modules in accordance with present embodiments may be incorporated with or provide power to stationary power systems (e.g., non-automotive systems).

To simplify the following discussion, the present techniques will be described in relation to a battery system with a 12 volt lithium ion battery and a 12 volt lead-acid battery. However, one of ordinary skill in art is able to adapt the present techniques to other battery systems, such as a battery system with a 48 volt lithium ion battery and a 12 volt lead-acid battery, systems that utilize high voltage (HV) lithium ion battery systems, stationary energy storage systems, and the like.

Figure 1:
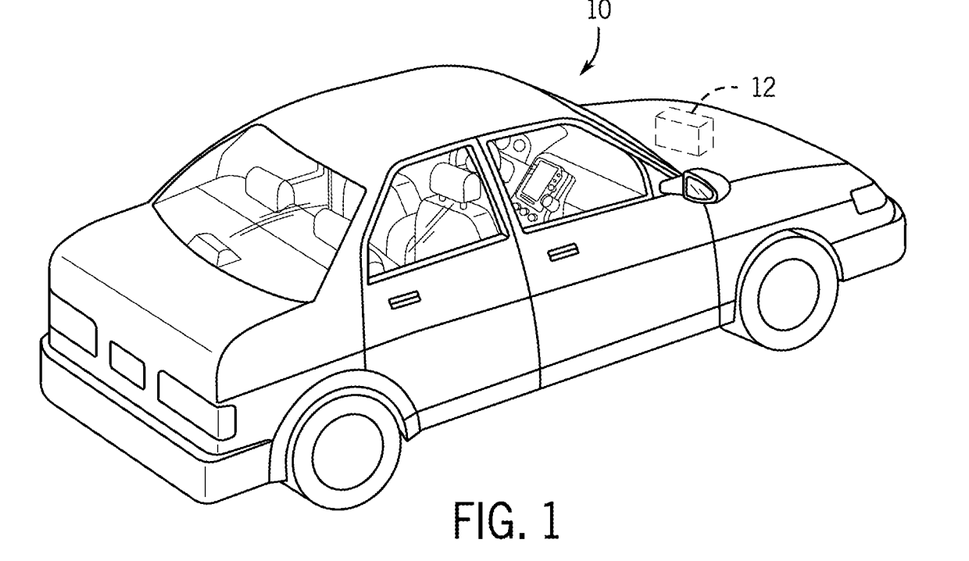
FIG. 1 is a perspective view of a vehicle having a battery system configured in accordance with present embodiments to provide power for various components of the vehicle, in accordance with an aspect of the present disclosure.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
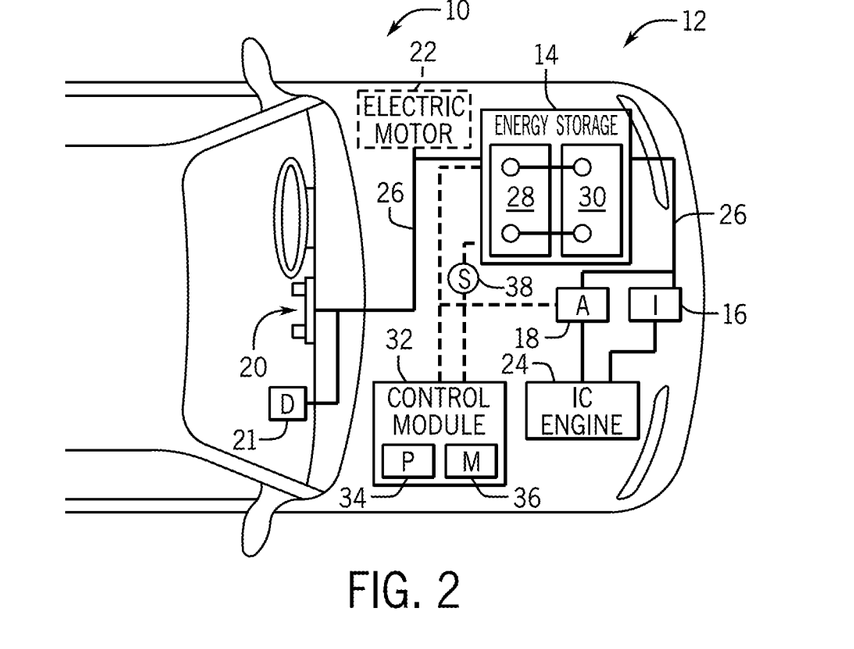
FIG. 2 is a cutaway schematic view of an embodiment of the vehicle and the battery system of FIG. 1, in accordance with an aspect of the present disclosure.

A more detailed view of the battery system 12 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 14 supplies power to the vehicle console 20, a display 21 within the vehicle, and the ignition system 16, which may be used to start (e.g., crank) an internal combustion engine 24.

Additionally, the energy storage component 14 may capture electrical energy generated by the alternator 18 and/or the electric motor 22. In some embodiments, the alternator 18 may generate electrical energy while the internal combustion engine 24 is running More specifically, the alternator 18 may convert the mechanical energy produced by the rotation of the internal combustion engine 24 into electrical energy. Additionally or alternatively, when the vehicle 10 includes an electric motor 22, the electric motor 22 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 22 during regenerative braking. As such, the alternator 18 and/or the electric motor 22 are generally referred to herein as a regenerative braking system.

To facilitate capturing and supplying electric energy, the energy storage component 14 may be electrically coupled to the vehicle's electric system via a bus 26. For example, the bus 26 may enable the energy storage component 14 to receive electrical energy generated by the alternator 18 and/or the electric motor 22. Additionally, the bus 26 may enable the energy storage component 14 to output electrical energy to the ignition system 16 and/or the vehicle console 20. Accordingly, when a 12 volt battery system 12 is used, the bus 26 may carry electrical power typically between 8-18 volts.

Additionally, as depicted, the energy storage component 14 may include multiple battery modules. For example, in the depicted embodiment, the energy storage component 14 includes a lead acid (e.g., a first) battery module 28 in accordance with present embodiments, and a lithium ion (e.g., a second) battery module 30, where each battery module 28, 30 includes one or more battery cells. In other embodiments, the energy storage component 14 may include any number of battery modules. Additionally, although the first battery module 28 and the second battery module 30 are depicted adjacent to one another, they may be positioned in different areas around the vehicle. For example, the second battery module 30 may be positioned in or about the interior of the vehicle 10 while the first battery module 28 may be positioned under the hood of the vehicle 10.

In some embodiments, the energy storage component 14 may include multiple battery modules to utilize multiple different battery chemistries. For example, the first battery module 28 may utilize a lead-acid battery chemistry and the second battery module 30 may utilize a lithium ion battery chemistry. In such an embodiment, the performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved. In accordance with present embodiments, the lithium ion battery module may include a housing that is constructed using the thermoplastic bonding techniques described herein.

To facilitate controlling the capturing and storing of electrical energy, the battery system 12 may additionally include a control module 32. More specifically, the control module 32 may control operations of components in the battery system 12, such as relays (e.g., switches) within energy storage component 14, the alternator 18, and/or the electric motor 22. For example, the control module 32 may regulate amount of electrical energy captured/supplied by each battery module 28 or 30 (e.g., to de-rate and re-rate the battery system 12), perform load balancing between the battery modules 28 and 30, determine a state of charge of each battery module 28 or 30, determine temperature of each battery module 28 or 30, determine a predicted temperature trajectory of either battery module 28 and 30, determine predicted life span of either battery module 28 or 30, determine fuel economy contribution by either battery module 28 or 30, determine an effective resistance of each battery module 28 or 30, control magnitude of voltage or current output by the alternator 18 and/or the electric motor 22, and the like.

Accordingly, the control module (e.g., unit) 32 may include one or more processors 34 and one or more memories 36. More specifically, the one or more processors 34 may include one or more application specific integrated circuits (ASICs), one or more field programmable gate arrays (FPGAs), one or more general purpose processors, or any combination thereof. Generally, the processor 34 may perform computer-readable instructions related to the processes described herein. Additionally, the processor 34 may be a fixed-point processor or a floating-point processor.

Additionally, the one or more memories 36 may include volatile memory, such as random access memory (RAM), and/or non-volatile memory, such as read-only memory (ROM), optical drives, hard disc drives, or solid-state drives. In some embodiments, the control module 32 may include portions of a vehicle control unit (VCU) and/or a separate battery control module. Additionally, as depicted, the control module 32 may be included separate from the energy storage component 14, such as a standalone module. In other embodiments, the battery management system (BMS) may be included within the energy storage component 14.

In certain embodiments, the control module 32 or the processor 34 may receive data from various sensors 38 disposed within and/or around the energy storage component 14. The sensors 38 may include a variety of sensors for measuring current, voltage, temperature, and the like regarding the battery module 28 or 30. After receiving data from the sensors 38, the processor 34 may convert raw data into estimations of parameters of the battery modules 28 and 30. As such, the processor 34 may render the raw data into data that may provide an operator of the vehicle 10 with valuable information pertaining to operations of the battery system 12, and the information pertaining to the operations of the battery system 12 may be displayed on the display 21. The display 21 may display various images generated by device 10, such as a GUI for an operating system or image data (including still images and video data). The display 21 may be any suitable type of display, such as a liquid crystal display (LCD), plasma display, or an organic light emitting diode (OLED) display, for example. Additionally, the display 21 may include a touch-sensitive element that may provide inputs to the adjust parameters of the control module 32 or data processed by the processor 34.

Figure 3:
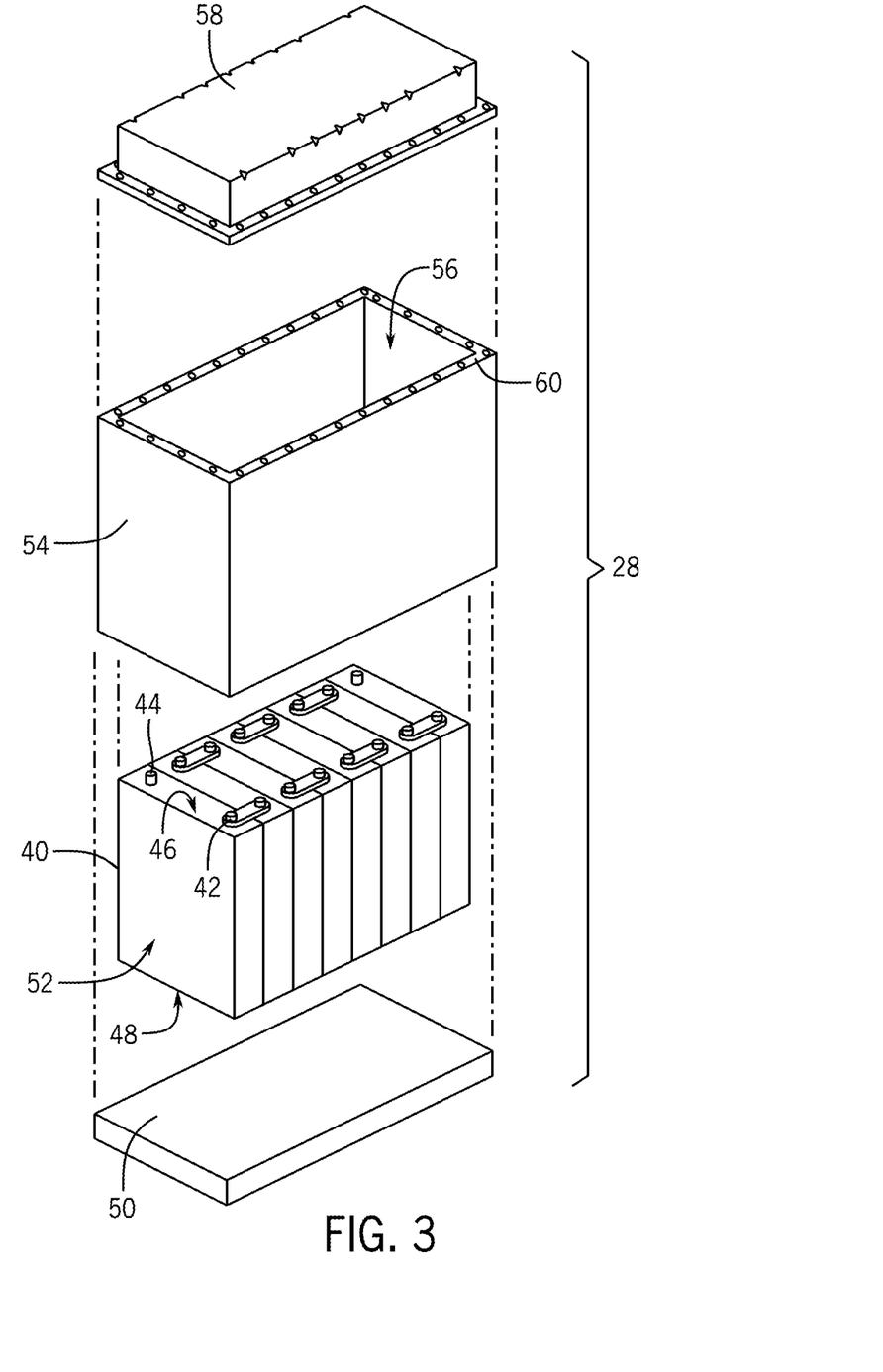
FIG. 3 is a block diagram of an example system for fusing thermoplastic, in accordance with an aspect of the present disclosure.

FIGS. 1 and 2 depict example systems that may house battery modules having housings that are produced using the thermoplastic bonding techniques described herein. FIG. 3 depicts an embodiment of the first (lithium ion) battery module 28 constructed in accordance with the present disclosure. Further, while the lithium ion battery module 28 depicted in FIG. 3 includes many components that may be common to battery modules configured in accordance with the teachings herein, it should be noted that the illustrated module is provided as an example to facilitate discussion of certain aspects of the present disclosure, and is not intended to exclude the presence of other battery module features (e.g., a battery control module, service disconnects, terminals, and various thermal management features). Further, certain battery modules that utilize welds produced in accordance with the present disclosure may not include certain of the features described herein.

In the illustrated embodiment, a plurality of battery cells 40 each include a first terminal 42 and a second terminal 44 located at a terminal end 46 of the battery cell 40. The terminal end 46 may be considered to be positioned opposite a base end 48 of the battery cell 40, the base end 48 being the end of the battery cell 40 that is located proximate to a base 50 of the lithium ion battery module 28. The terminal end 46 may be part of a lid or cover assembly that encloses a casing 52 of the battery cell 40, and the casing 52 encloses the electrochemical elements of the battery cell 40 (e.g., the electrochemical cell and electrolyte). These electrochemical elements, during operation (and in particular during formation) of the battery cell 40, may generate gases and include materials that may be sensitive to external environments. Further, while illustrated as prismatic battery cells, it should be noted that the approaches described herein may also be applied to other battery module configurations having other battery cell geometries and types, for example cylindrical battery cells and pouch battery cells.

While illustrated as being located on the same end of the battery cells 40, in other embodiments, the first and second terminals 42, 44 may be located at different sides of the battery cell 40, such as one at the terminal end 46 and one at the base end 48.

The illustrated lithium ion battery module 28 seals these battery cells 40 from the external environment with a battery housing 54, which couples to the base 50. While shown as separate components, in certain embodiments, the battery housing 54 and the base 50 may be integrally formed (e.g., molded, welded, fabricated) into a single piece into which the battery cells 40 are placed. The battery housing 54 and the base 50 may therefore define a cavity 56 for holding the battery cells 40. The battery housing 54, in general, protects the battery cells 40 from the external environment, and may maintain the position of each battery cell 40 relative to the other battery cells 40.

A module cover 58 is placed over the housing 54 to enclose the lithium ion battery module 28. In certain embodiments, the module cover 58 may house certain components, such as venting mechanisms for the battery module 28, electronics, and so forth. Further, in certain embodiments, the module cover 58 may be coupled to the housing 54 in a different orientation than the orientation illustrated in FIG. 3, depending on various design considerations (e.g., locations of module terminals, venting locations). In accordance with present embodiments, an energy absorbing insert 60 may be positioned between coupling surfaces of the module cover 58 and the module housing 54.

Figure 4:
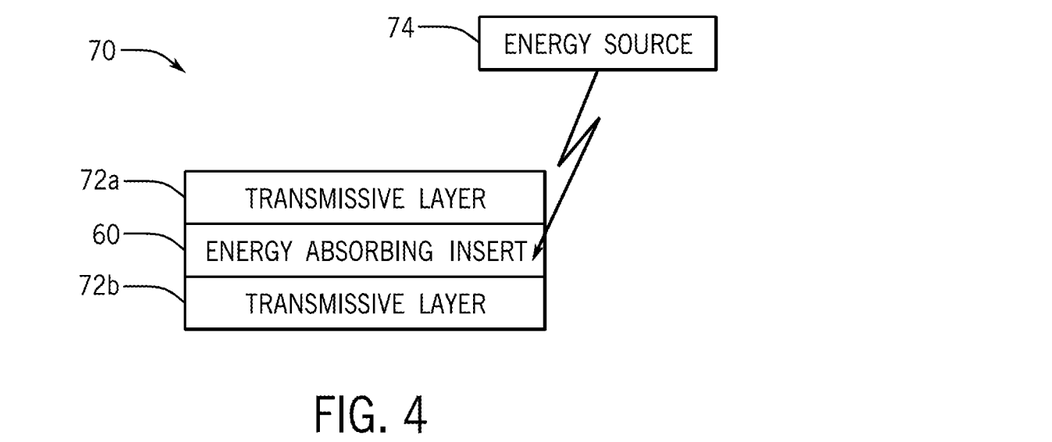
FIG. 4 is a block diagram of another example system for fusing thermoplastic, in accordance with an aspect of the present disclosure.

The manner in which the module housing 54 and the module cover 58 are coupled may be further appreciated with reference to FIG. 4, which is a block diagram of an example system for fusing thermoplastic using the energy absorbing insert 60 in accordance with embodiments of the disclosure. The system is generally referred to as system "70." System 70 includes a first transmissive layer 72a and a second transmissive layer 72b, and the energy absorbing insert 60. While two transmissive layers 72a, 72b and one energy absorbing insert 60 are shown in FIG. 4, more than two transmissive layers and/or more than one energy absorbing insert 60 can be used in accordance with the present disclosure.

In one or more embodiments, the transmissive layer 72 is transmissive with respect to a particular band of the electromagnetic spectrum, such as certain wavelengths or bands of wavelengths of a laser. In certain embodiments, the energy absorbing insert 60 is an opaque or black polypropylene layer that is configured to absorb energy as described herein. By way of non-limiting example, the energy absorbing insert 60 is based on the parent material being welded. Carbon black is a material (e.g., a pigment) that can be used to make plastics, including polypropylene, black in color. Carbon black is also a good absorber of certain types of laser energy, even at the relatively low loading levels (e.g., 0.02%-0.5% by weight) used in the molded parts described herein. Other materials (e.g., pigments) can be used to adjust the transmissivity (or absorbance) of the energy absorbing insert 60.

In contrast, pigments used to make parts black yet retain their transmissivity cannot be carbon black, but certain black transmissive pigments may used in molding black transmissive parts. In one or more embodiments, the energy absorbing insert 60 is a rigid or semi-rigid (rigid but not inflexible, such as somewhat flexible or having sections that are flexible) layer or component that is configured to melt and/or become pliable when subjected to a particular type of laser energy. Thus, system 70 includes an energy source 74 for transmitting energy to one or more layers/components of system 70 as described herein.

For example, in one or more embodiments, the first transmissive layer 72a may be adjacent to a first side of the energy absorbing insert 60 while the second transmissive layer 72b is adjacent to a second side of the energy absorbing insert 60. In one or more embodiments, the energy source 74 is a laser. When energy is applied to energy absorbing insert 60 by energy source 74, energy absorbing insert 60 melts and fuses together first transmissive layer 72a and the second transmissive layer 72b, thereby creating a weld joint. Both transmissive layers 72a, 72b are configured to allow the energy from energy source 74 to pass through with no or negligible absorbance of the energy. In one or more embodiments, the energy from energy source 74 is applied to the energy absorbing insert 60 for less than two seconds to melt at least the portion of the energy absorbing insert 60 that is being exposed to the energy. In one or more embodiments, the wavelength is chosen based on the transmission spectrum of the plastic being welded. As one example, a 1070 nm fiber laser, commonly referred to as a "1 micron" laser, can be used. While polypropylene has an adequate transmissivity at this wavelength, other wavelengths closer to 2 microns may be more efficient. Thus, by way of example, the use of a 2 micron wavelength laser is also contemplated. Of note, the present embodiments are not limited to the use of 1 or 2 micron wavelength lasers. These values are provided only as examples that may be suitable for use with polypropylene. Other values can be used with polypropylene and with other materials.

Figure 5:
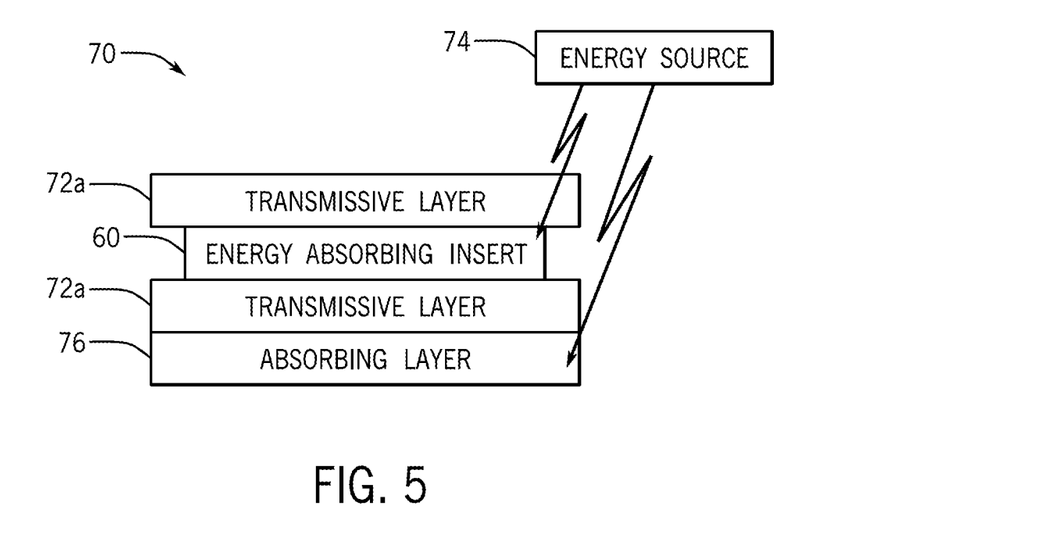
FIG. 5 is a block diagram of yet another example system for fusing thermoplastic, in accordance with an aspect of the present disclosure.

FIG. 5 is a block diagram of another embodiment of the system 70 in accordance with an aspect of the present disclosure. The illustrated embodiment of the system 70 includes an absorbing layer 76 that is configured to absorb energy from the energy source 74. In this embodiment, the absorbing insert 60 is positioned to fuse to first transmissive layer 72a and the second transmissive layer 72b, as described above, while absorbing layer 76 is positioned to fuse together with the second transmissive layer 72b upon absorbing enough energy from energy source 74 to melt a portion of absorbing layer 76, thereby creating several weld joints. In one or more embodiments, the first transmissive layer 72a, the energy absorbing insert 60, the second transmissive layer 72b and the absorbing layer 76 are composed of the same material. In one or more embodiments, this material is polypropylene.

In one or more embodiments, energy absorbing insert 60 is predefined shape such as to prevent blocking of all energy from energy source 74. For example, in one or more embodiments, energy absorbing insert 60 overlaps only a portion of first transmissive layer 72a and/or the second transmissive layer 72b. For example, a surface area of the absorbing inert 60 is less than a surface area of the first transmissive layer 72a and/or surface area of the second transmissive layer 72b. In one or more embodiments, energy from the energy source 74 passes through one or more apertures in the energy absorbing insert 60, thereby allowing energy from energy source 74 to reach absorbing layer 76. In one or more embodiments, the thickness of energy absorbing insert 60 is less than 1.5 mm. In one or more embodiments, energy absorbing insert 60 is a ring shape or is configured to abut an opening/aperture. In one or more embodiments, energy absorbing insert 60 includes geometrical and/or non-geometrical portions, and/or one or more apertures.

According to one embodiment of the disclosure, a method for fusing thermoplastic is provided. Energy absorbing insert 60 is positioned adjacent to the first thermoplastic layer 72a and to second thermoplastic layer 72b. Energy is applied to energy absorbing insert 60 to melt energy absorbing insert 60 for fusing first thermoplastic layer 72a to second thermoplastic layer 72b. First thermoplastic layer 72a is one of a transmissive and semi-transmissive layer, configured to allow the energy the pass through first thermoplastic layer 72a.

According to one aspect of this embodiment, the energy is laser energy from energy source 74. According to one aspect of this embodiment, the laser energy is infrared laser energy. According to one aspect of this embodiment, first thermoplastic layer 72a is a cover for an electronics housing for electronics. According to one aspect of this embodiment, the absorbing layer 76 is positioned adjacent a first side of second thermoplastic layer 72b. The first side is opposite a second side of second thermoplastic layer 72b that is adjacent energy absorbing insert 60. The energy is applied to the absorbing layer 76 to fuse the absorbing layer 76 to second thermoplastic layer 72b. The energy is applied to the absorbing layer 76 passing through second thermoplastic layer 72b.

According to one aspect of this embodiment, second thermoplastic layer 72b is a battery housing lid that defines a portion of an electronics housing. According to one aspect of this embodiment, the energy absorbing insert 60 is semi-rigid in the absence of the application of energy to energy absorbing insert 60. According to one aspect of this embodiment, the first thermoplastic layer 72a is one of a clear and translucent polypropylene and the second thermoplastic layer 72b is one of a clear and translucent polypropylene.

Figure 6:
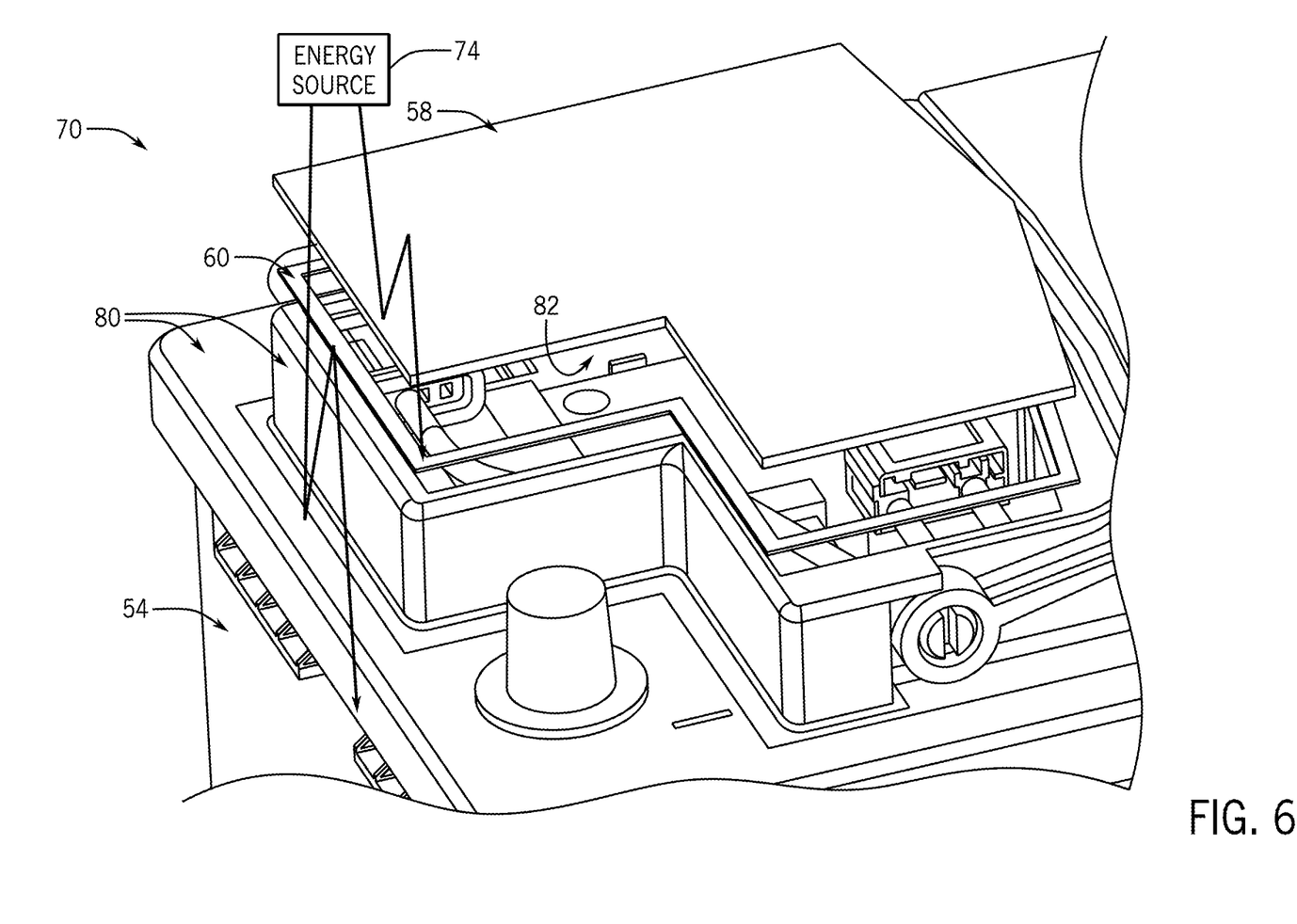
FIG. 6 is a flow diagram of an example process for fusing thermoplastic, in accordance with an aspect of the present disclosure.

FIG. 6 is a partial overhead perspective view of one embodiment of the system 70 in accordance with certain embodiments of the present disclosure. In the embodiment of FIG. 6, the system 70 includes the battery module housing 54, which is coupled to a lid 80 and the cover 58. The housing 54, the lid 80, and the cover 54 are all of thermoplastic construction. As illustrated, the energy absorbing insert 60 is positioned to absorb energy from the energy source 74 to couple the cover 58 to the lid 80.

In the illustrated embodiment, the lid 80 is positioned adjacent and/or stacked on the battery module housing 54, and the cover 58 is positioned adjacent and/or stacked on the lid 80. The lid 80 is configured to cover a battery compartment of the housing 54, and the cover 58 is configured to cover an electronics compartment 82 where various features such as the control module 32, signal connectors, and so forth, are located. The electronics compartment 82 may be formed by both the lid 80 and the cover 58.

In certain embodiments, the battery module housing 54 corresponds to the absorbing layer 76 as described above. Further, in certain embodiments, the lid 80 is one of the first or second transmissive layers 72, such as the second transmissive layer 72b described above. In the illustrated embodiment, the energy absorbing insert 60 forms a ring positioned between the lid 80 and the cover 58. In this respect, the cover 54 may correspond to the first transmissive layer 72a described above.

To seal the battery module 28, energy from energy source 74 is applied to the battery module housing 54 through the lid 80 such that battery module housing 54 at least partially melts, and fuses together with the lid 80. Further, energy from energy source 74 is applied to energy absorbing insert 60 though cover 58 to fuse the lid 80 to cover 58 by melting the energy absorbing insert 60. In one or more embodiments, cover 58 is a cover for an electronics housing defined by both lid 80 and the cover 58. The cover 58 is one of a transmissive and semi-transmissive layer, configured to allow the energy the pass through the cover 58.

According to one aspect of this embodiment, the energy is laser energy from energy source 74. According to one aspect of this embodiment, the laser energy is infrared laser energy. According to one aspect of this embodiment, the battery module housing 54 is positioned adjacent a first side of the lid 80. The first side is opposite a second side of the lid 80 that is adjacent the energy absorbing insert 24. Battery module housing 54 is configured to receive energy to melt battery module housing 54 for fusing battery module housing 54 to thermoplastic battery housing lid 80. The energy is applied to battery module housing 54 passing through the lid 80. According to one aspect of this embodiment, the energy absorbing insert 60 is semi-rigid in the absence of the application of energy to energy absorbing insert 60. According to one embodiment, the cover 58 is one of a clear or translucent polypropylene. According to one embodiment, the lid 80 is one of a clear and translucent polypropylene.

Figure 7:
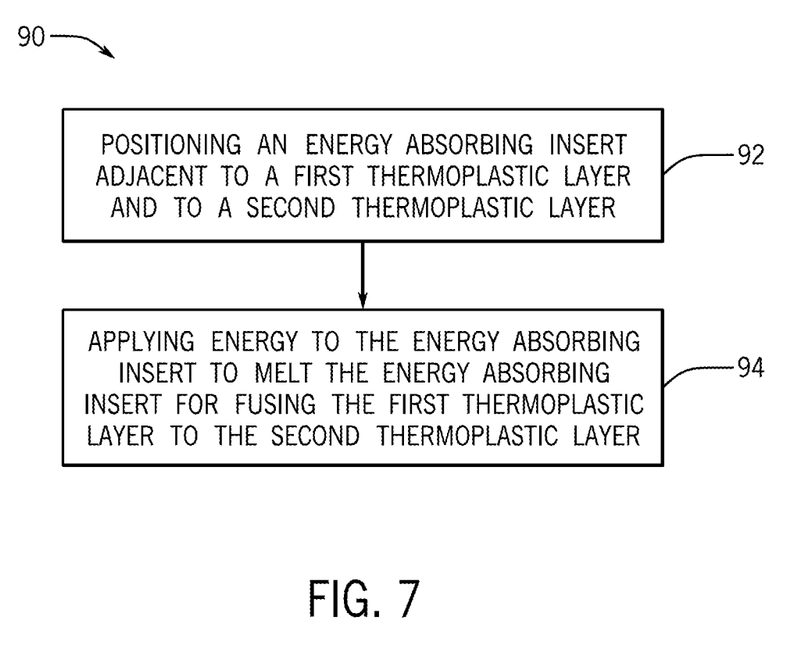
FIG. 7 is a process flow diagram of an embodiment of a method of coupling thermoplastic components.

FIG. 7 is a process flow diagram of an embodiment of a method 90 of coupling thermoplastic components, for example during construction of a lithium ion battery module (e.g., the battery module 28). At block 92, the energy absorbing insert 60 is positioned adjacent to the first thermoplastic layer 72a and to the second thermoplastic layer 72b (e.g., between them).

At block 94, energy is applied to the energy absorbing insert 60 to fuse first thermoplastic layer 72a to the second thermoplastic layer 72b. In one or more embodiments, first thermoplastic layer 12 being one of a transmissive and semi-transmissive layer, configured to allow the energy the pass through first thermoplastic layer 12. In one or more embodiments, the energy is laser energy.

One or more of the disclosed embodiments, alone or on combination, may provide one or more technical effects including the manufacture of battery modules in a manner that allows the housing of the modules to be sealed in an efficient and precise manner. The technical effects and technical problems in the specification are example and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for bonding components of a lithium ion battery module comprising:
   positioning an energy absorbing insert adjacent to a first thermoplastic layer of the lithium ion battery module, with the first thermoplastic layer being a thermoplastic cover, and to a second thermoplastic layer of the lithium ion battery module, with the second thermoplastic layer being a lid, wherein the first thermoplastic layer and the second thermoplastic layer are transmissive or semi-transmissive layers that allow applied energy to pass through the first thermoplastic layer and the second thermoplastic layer;
   applying energy through the first thermoplastic layer to the energy absorbing insert which absorbs the applied energy and melts the energy absorbing insert, thereby fusing the thermoplastic cover to the lid;
   positioning an energy absorbing layer adjacent to the lid with the lid separating the energy absorbing layer and the thermoplastic cover, the energy absorbing layer being a battery module housing separate from the lid; and
   applying a second energy at and initially contacting the lid and at least partially fusing the energy absorbing layer to the lid.

2. The method of claim 1, wherein the energy is laser energy.

3. The method of claim 2, wherein the laser energy is infrared laser energy.

4. The method of claim 1, wherein the first thermoplastic layer is a cover for an electronics compartment cover of the lithium ion battery module.

5. The method of claim 4, further comprising:
   positioning a third thermoplastic layer adjacent a first side of the second thermoplastic layer, the first side being opposite a second side of the second thermoplastic layer that is adjacent the energy absorbing insert; and
   applying the energy to the third thermoplastic layer to fuse the third thermoplastic layer to the second thermoplastic layer, the energy being applied to the third thermoplastic layer via a transmission through the second thermoplastic layer.

6. The method of claim 1, wherein the second thermoplastic layer is a battery housing lid defining a portion of an electronics housing.

7. The method of claim 1, wherein the energy absorbing insert is semi-rigid in an absence of applying the energy to the energy absorbing insert.

8. The method of claim 1, wherein the first thermoplastic layer is one of a first clear or translucent polypropylene, and the second thermoplastic layer is one of a second clear or translucent polypropylene.

9. A lithium ion battery module housing comprising:
   a thermoplastic cover composed of a first transmissive or semi-transmissive layer configured to allow a transmission of an energy of a particular wavelength through the thermoplastic cover;
   a thermoplastic battery housing lid, composed of a second transmissive or semi-transmissive layer;
   an energy absorbing insert positioned between the thermoplastic cover and the thermoplastic battery housing lid, the energy absorbing insert composed of a material which absorbs the energy of the particular wavelength transferred through the thermoplastic cover and melts in response to the absorption, wherein the energy absorbing insert forms at least a part of a plastic weld joint between the thermoplastic cover and the thermoplastic battery housing lid; and
   an energy absorbing layer being a battery module housing separate from and adjacent to the thermoplastic battery housing lid and opposite the thermoplastic cover, the energy absorbing layer absorbs the energy of the particular wavelength directed at and initially contacting the energy absorbing layer and melts.

10. The lithium ion battery module housing of claim 9, wherein the energy of the particular wavelength is laser energy.

11. The lithium ion battery module housing of claim 10, wherein the laser energy is infrared laser energy.

12. The lithium ion battery module housing of claim 9, wherein the thermoplastic cover is a cover for an electronics compartment configured to interface with electronics.

13. The lithium ion battery module housing of claim 9, further comprising a thermoplastic battery module housing positioned adjacent and coupled to a first side of the thermoplastic battery housing lid, the first side being opposite a second side of the thermoplastic battery housing lid that is adjacent the energy absorbing insert.

14. The lithium ion battery module housing of claim 13, wherein the thermoplastic battery module housing is configured to absorb the energy.

15. The lithium ion battery module housing of claim 14, wherein the thermoplastic cover and the thermoplastic battery module housing are coupled via a laser weld.

16. The lithium ion battery module housing of claim 9, wherein the energy absorbing insert is semi-rigid in an absence of an application of the energy to the energy absorbing insert.

17. The lithium ion battery module housing of claim 9, wherein the thermoplastic cover is one of a first clear or translucent polypropylene, and the thermoplastic battery housing lid is one of a second clear or translucent polypropylene.

18. A lithium ion battery module comprising:
a plurality of lithium ion battery cells held within an enclosure;
a battery module housing coupled to a lid, the battery module housing and the lid forming the enclosure; and
a plurality of electronics components held within an electronics compartment formed by the lid and a cover of the lithium ion battery module, wherein the plurality of electronics components are operatively coupled to the plurality of lithium ion battery cells;
wherein the battery module housing and the lid are joined by a first weld to form a direct connection between the battery module housing and the lid, and the lid and the cover are joined by a second weld opposite the housing, wherein the second weld is formed between the lid and the cover via an energy absorbing insert in a laminar relationship with the lid and the cover having an increased absorbance in an infrared portion of an electromagnetic spectrum relative to the battery module housing and the cover through which the infrared portion travels.

19. The lithium ion battery module of claim 18, wherein the first weld and the second weld are both laser welds formed using an infrared laser.

20. The lithium ion battery module of claim 18, wherein the battery module housing, the lid, and the cover are all composed of a same plastic, and the energy absorbing insert comprises the same plastic with a pigment that facilitates infrared absorbance.

* * * * *